United States Patent
Ballard

(10) Patent No.: US 9,814,218 B2
(45) Date of Patent: Nov. 14, 2017

(54) SYSTEMS DEVICES, AND/OR METHODS FOR MANAGING HIVE BODIES

(71) Applicant: Lannie D. Ballard, Natural Bridge, VA (US)

(72) Inventor: Lannie D. Ballard, Natural Bridge, VA (US)

(*) Notice: Subject to any disclaimer, the term of this patent is extended or adjusted under 35 U.S.C. 154(b) by 170 days.

(21) Appl. No.: 14/732,543

(22) Filed: Jun. 5, 2015

(65) Prior Publication Data

US 2016/0000049 A1    Jan. 7, 2016

Related U.S. Application Data

(60) Provisional application No. 61/998,684, filed on Jul. 7, 2014.

(51) Int. Cl.
*A01K 55/00* (2006.01)

(52) U.S. Cl.
CPC .................................... *A01K 55/00* (2013.01)

(58) Field of Classification Search
CPC ... A01K 55/00; A45F 5/10; A45F 2005/1006; A45F 5/12; A45F 2200/05
See application file for complete search history.

(56) References Cited

U.S. PATENT DOCUMENTS

| | | | | |
|---|---|---|---|---|
| 705,878 | A * | 7/1902 | Shottenberg | B65G 7/12 294/164 |
| 799,421 | A * | 9/1905 | Tscharner | A47J 45/10 294/164 |
| 1,441,452 | A * | 1/1923 | Ringel | A47J 45/10 294/28 |
| 2,049,568 | A * | 8/1936 | Martin | A45F 5/10 294/164 |
| 3,159,417 | A * | 12/1964 | Courtox | A01K 55/00 294/113 |
| 3,251,521 | A * | 5/1966 | Fay | A47J 45/10 206/499 |
| 3,374,026 | A * | 3/1968 | Coleman | A47J 43/18 294/118 |
| 4,220,366 | A * | 9/1980 | Trudell | B25B 7/00 294/104 |
| 4,527,823 | A * | 7/1985 | Straus | B65G 7/12 294/118 |

FOREIGN PATENT DOCUMENTS

GB          2279030 A * 12/1994 ............... B65G 7/12

* cited by examiner

*Primary Examiner* — Kathleen I Alker
(74) *Attorney, Agent, or Firm* — Dale Jensen, PLC; Dale Jensen

(57) ABSTRACT

Certain exemplary embodiments can provide a system, which comprises a first bar and a second bar. Each of the first bar and the second bar comprise a first end, a second end, five substantially straight portions, and two lifting flanges. Each of the five substantially straight portions of each bar is coupled to an adjacent substantially straight portion via a curved portion that defines a radius of curvature.

4 Claims, 8 Drawing Sheets

US 9,814,218 B2

SYSTEMS DEVICES, AND/OR METHODS FOR MANAGING HIVE BODIES

CROSS-REFERENCES TO RELATED APPLICATIONS

This application claims priority to, and incorporates by reference herein in its entirety, U.S. Provisional Patent Application Ser. No. 61/998,684, filed 7 Jul. 2014.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a tool that can be used on virtually all sizes of hive bodies. The brood box has plenty of depth so the tool does not stick below the box. That makes it easy to set down most anywhere. With the medium and shallow boxes just set the first box crossways on an inverted hive cover or another box to make sure the bottom of the hive tool is clear. This tool was designed to make it easier to lift single boxes with weights up to 70 pounds or more. This tool was not designed to be used over an outer cover.

This tool was designed for the older beekeeper with less strength in the hands, women and younger beekeepers who have smaller hands and anyone with arthritis in his or her hands.

Certain exemplary embodiments can provide a system, which comprises a first bar and a second bar. Each of the first bar and the second bar comprise a first end, a second end, five substantially straight portions, and two lifting flanges. Each of the five substantially straight portions of each bar is coupled to an adjacent substantially straight portion via a curved portion that defines a radius of curvature.

Figure 1:
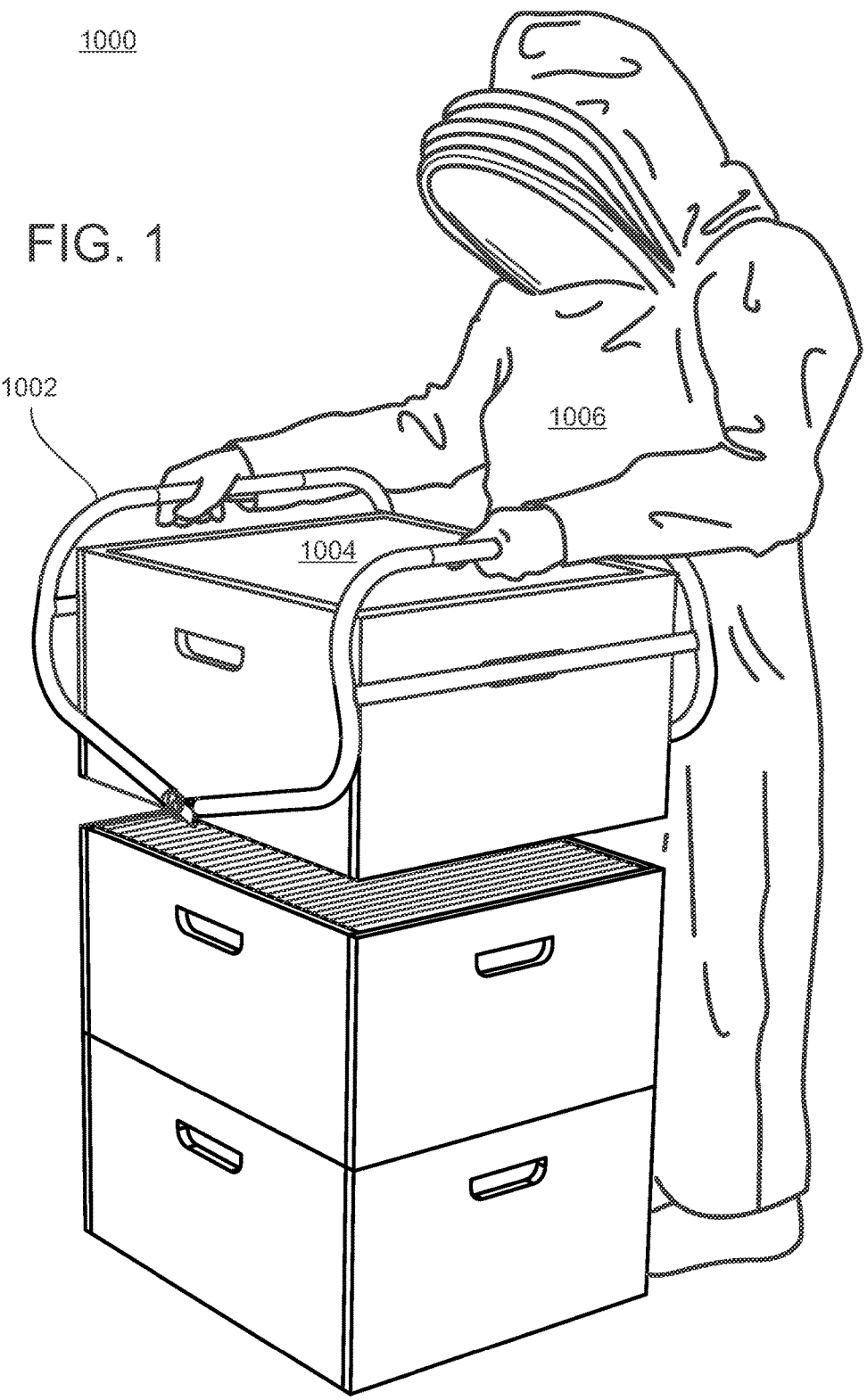
FIG. 1 is a perspective view of an exemplary embodiment of a system 1000.

FIG. 1 is a perspective view of an exemplary embodiment of a system 1000, which comprises a lifting frame 1002. Lifting frame 1002 can facilitate lifting of a box 1004 by a single user 1006. In certain exemplary embodiments, box 1004 can be a bee hive.

Figure 2:
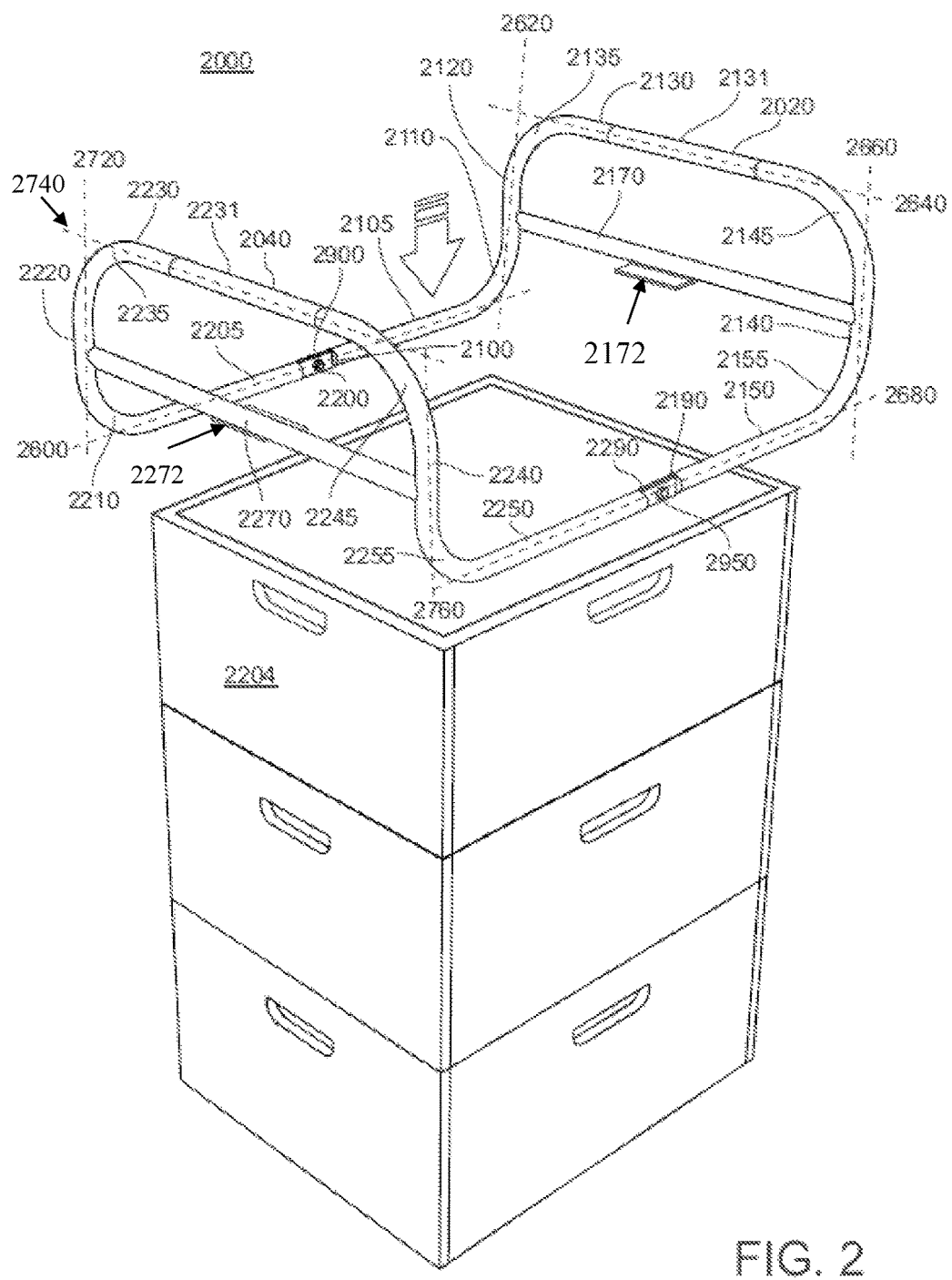
FIG. 2 is a perspective view of an exemplary embodiment of a system 2000.

FIG. 2 is a perspective view of an exemplary embodiment of a system 2000, which can comprise a first bar 2020 and a second bar 2040. First bar 2020 comprises:

a first end 2100;
a second end 2190;
a first substantially straight portion 2105, first substantially straight portion 2105 comprises and/or is coupled to first end 2100;
a second substantially straight portion 2120, second substantially straight portion 2120 coupled to first substantially straight portion 2105 via a first curved portion 2110 defining a first radius of curvature (see first radius of curvature A of FIG. 6), a longitudinal axis 2600 of first substantially straight portion 2105 of first bar 2020 intersecting with a longitudinal axis 2620 of second substantially straight portion of first bar 2020 at an angle of approximately ninety degrees;
a third substantially straight portion 2130, third substantially straight portion is coupled to second substantially straight portion 2120 via a second curved portion 2135 defining a second radius of curvature (see second radius of curvature B of FIG. 6), longitudinal axis 2620 of second substantially straight portion 2120 of first bar 2020 intersecting with a longitudinal axis 2640 of third substantially straight portion 2130 of first bar 2020 at an angle of approximately ninety degrees, the third substantially straight portion 2130 can comprise a gripping surface 2131, gripping surface 2131 can comprise shrinkable tubing placed over metal tubing of second bar 2040;
a fourth substantially straight portion 2140, fourth substantially straight portion 2140 is coupled to third substantially straight portion 2130 via a third curved portion 2145 defining second radius of curvature (see second radius of curvature B of FIG. 6), longitudinal axis 2640 of third substantially straight portion 2130 of first bar 2020 intersecting with a longitudinal axis 2660 of fourth substantially straight portion 2140 of first bar 2020 at an angle of approximately ninety degrees;
a fifth substantially straight portion 2150, fifth substantially straight portion 2150 coupled to fourth substantially straight portion 2140 via a fourth curved portion 2155 defining the first radius of curvature (see first radius of curvature A of FIG. 6), longitudinal axis 2660 of fourth substantially straight portion 2140 of first bar 2020 intersecting with a longitudinal axis 2680 of fifth substantially straight portion 2150 of first bar 2020 at an angle of approximately ninety degrees, fifth substantially straight portion 2150 comprising second end 2190;
a first cross member 2170 coupled to second substantially straight portion 2120 of first bar 2020 and fourth substantially straight portion 2140 of first bar 2020, wherein first cross member 2170 is constructed to maintain a spacing between second substantially straight portion 2120 of first bar 2020 and fourth substantially straight portion 2140 of first bar 2020; and/or
a first lifting flange 2172 (see also first lifting flange 7100 of the first bar of FIG. 7), first lifting flange 2172 coupled to first cross member 2170, a longitudinal axis (see longitudinal axis 7600 of FIG. 7) of first lifting flange 2172 (see first lifting flange 7100 of FIG. 7) intersecting with longitudinal axis 2620 (see also longitudinal axis 7620 of FIG. 7) of second substantially straight portion 2120 of first bar 2020 at an angle of approximately sixty degrees;

Second bar 2040 can comprise:
a first end 2200;
a second end 2290;

a first substantially straight portion 2205, which comprises first end 2200;

a second substantially straight portion 2220, second substantially straight portion 2220 coupled to first substantially straight portion 2205 via a first curved portion 2210 defining the first radius of curvature (see first radius of curvature A of FIG. 6), a longitudinal axis (substantially collinear with longitudinal axis 2600 in the illustrated configuration) of first substantially straight portion 2205 of second bar 2040 intersecting with a longitudinal axis 2720 of second substantially straight portion 2220 of second bar 2040 at an angle of approximately ninety degrees;

a third substantially straight portion 2230, third substantially straight portion 2230 coupled to second substantially straight portion 2220 via a second curved portion 2235 defining the second radius of curvature (see second radius of curvature B of FIG. 6), longitudinal axis 2720 of second substantially straight portion 2220 of second bar 2040 intersecting with a longitudinal axis 2740 of third substantially straight portion 2230 of second bar 2040 at an angle of approximately ninety degrees, the third substantially straight portion 2230 can comprise a gripping surface 2231, gripping surface 2231 can comprise shrinkable tubing placed over metal tubing of second bar 2040;

a fourth substantially straight portion 2240, fourth substantially straight portion 2240 coupled to third substantially straight portion 2230 via a third curved portion 2245 defining the second radius of curvature (see second radius of curvature B of FIG. 6), longitudinal axis 2740 of third substantially straight portion 2230 of second bar 2040 intersecting with a longitudinal axis 2760 of fourth substantially straight portion 2240 of second bar 2040 at the angle of approximately ninety degrees;

a fifth substantially straight portion 2250, fifth substantially straight portion 2250 coupled to fourth substantially straight portion 2240 via a fourth curved portion 2255 defining the first radius of curvature (see first radius of curvature A of FIG. 6), longitudinal axis 2740 of fourth substantially straight portion 2240 of second bar 2040 intersecting with a longitudinal axis (substantially collinear with longitudinal axis 2680 in the configuration of the illustrated embodiment) of fifth substantially straight portion 2250 of second bar 2040 at an angle of approximately ninety degrees, fifth substantially straight portion 2250 comprising second end 2290;

a second cross member 2270 coupled to second substantially straight portion 2220 of second bar 2040 and fourth substantially straight portion 2240 of second bar 2040, wherein second cross member 2270 is constructed to maintain a spacing between second substantially straight portion 2220 of second bar 2040 and fourth substantially straight portion 2240 of second bar 2040;

a second lifting flange 2272 (see also second lifting flange 7200 of FIG. 7), second lifting flange 2272 coupled to fourth substantially straight portion 2240 (see also second substantially straight portion 7400 of FIG. 7) of second bar 2040, a longitudinal axis (see longitudinal axis 7700 of FIG. 7) of second lifting flange 2272 (see also second lifting flange 7200 of FIG. 7) intersecting with longitudinal axis 2760 (see longitudinal axis 7720 of FIG. 7) of fourth substantially straight portion 2240 of second bar 2040 at an angle of approximately sixty degrees.

Wherein first bar 2020 is coupled to second bar 2040 via:

a first pivotable pin 2900 between first end 2100 of first bar 2020 and first end 2200 of second bar 2040; and a second pivotable pin 2950 between second end 2190 of first bar 2020 and second end 2290 of second bar 2040.

Wherein each of first lifting flange 2172 and second lifting flange 2272 are adapted to grip a surface of a box 2204 when a user (e.g., user 1006 of FIG. 1) grips the third substantially straight portion 2130 of first bar 2020 and third substantially straight portion 2230 of second bar 2040 and applies a force directed toward a center of box 2204. The system can be constructed to enable the user to lift box 2204 alone. In certain exemplary embodiment first bar 2020 is tubular. In certain exemplary embodiment first bar 2020 and second bar 2040 comprise metal tubing, such as steel tubing or aluminum tubing.

Figure 3:
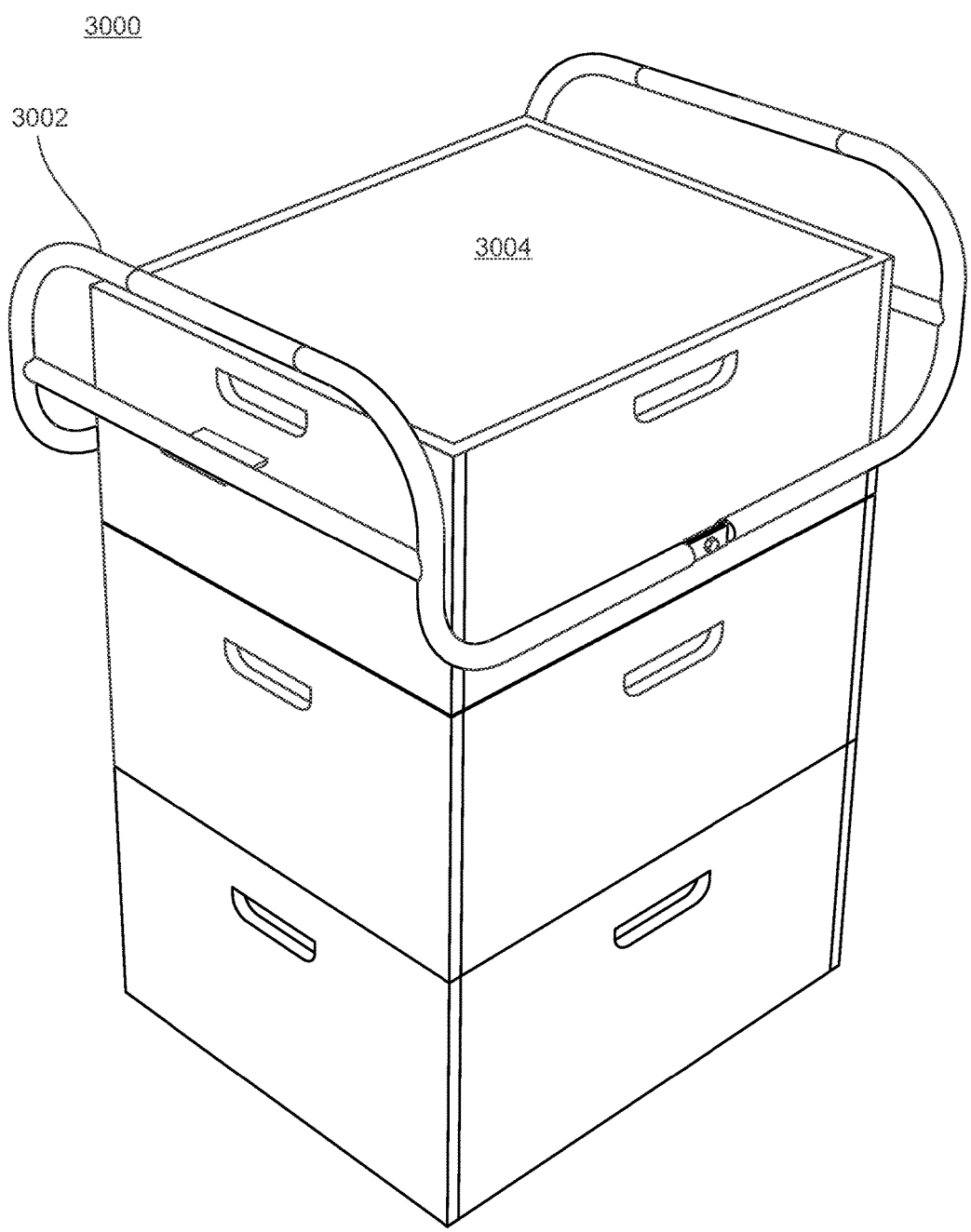
FIG. 3 is a perspective view of an exemplary embodiment of a system 3000.

FIG. 3 is a perspective view of an exemplary embodiment of a system 3000, which illustrates a lifting frame 3002 placed on a box 3004 in preparation for lifting box 3004.

Figure 4:
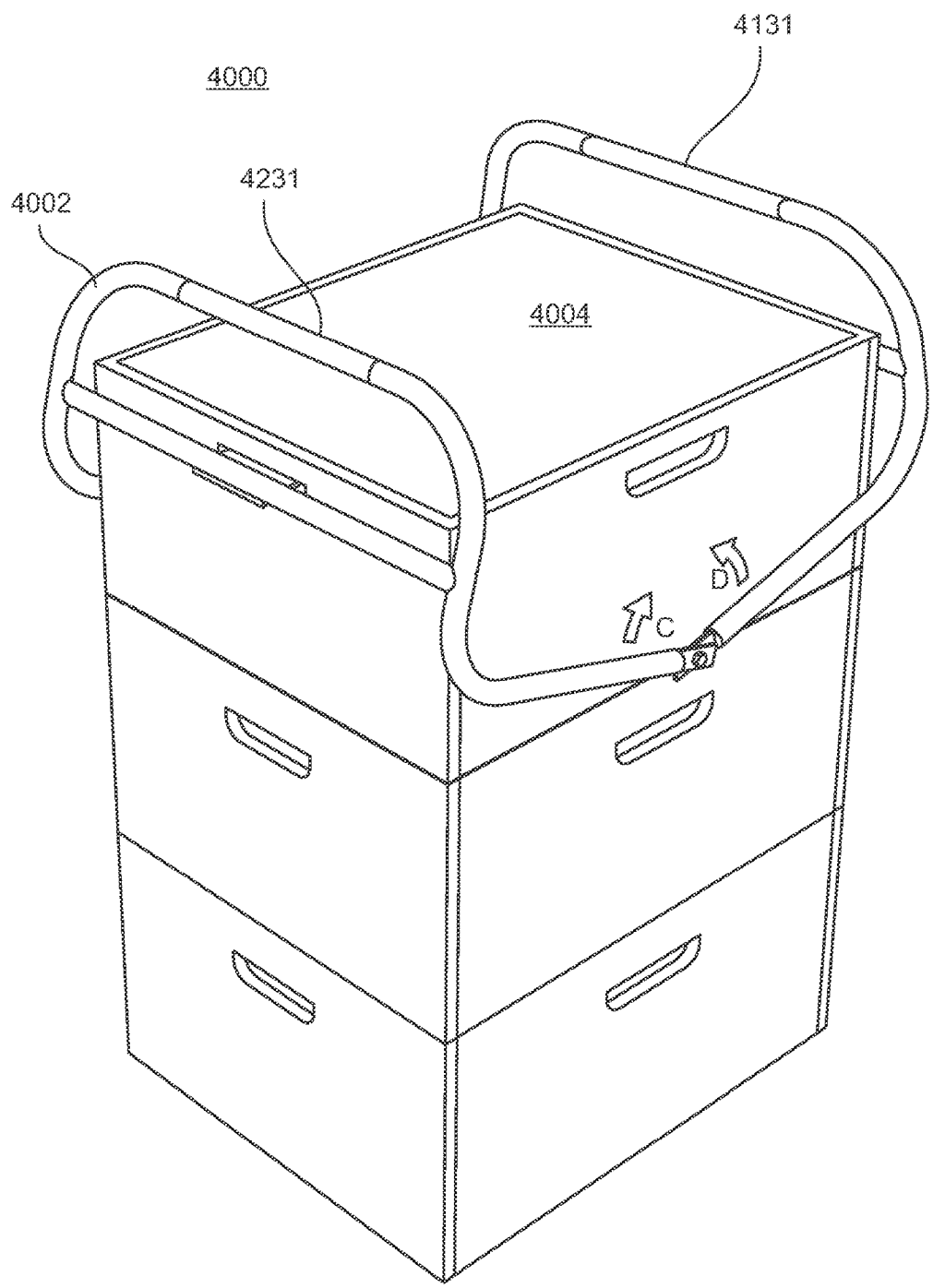
FIG. 4 is a perspective view of an exemplary embodiment of a system 4000.

FIG. 4 is a perspective view of an exemplary embodiment of a system 4000, which illustrates a lifting frame 4002 engaged with a box 4004 in preparation for lifting box 4004. Via a user (e.g., user 1006 of FIG. 1) holding first gripping surface 4131 and second gripping surface 4231. Such gripping causes bars of lifting frame 4002 to deflect by angles C and D in order for the lifting flanges (e.g., first lifting flange 7100 and second lifting flange 7200 of FIG. 7 and their associated mirror image flanges) to engage with box 4004.

Figure 5:
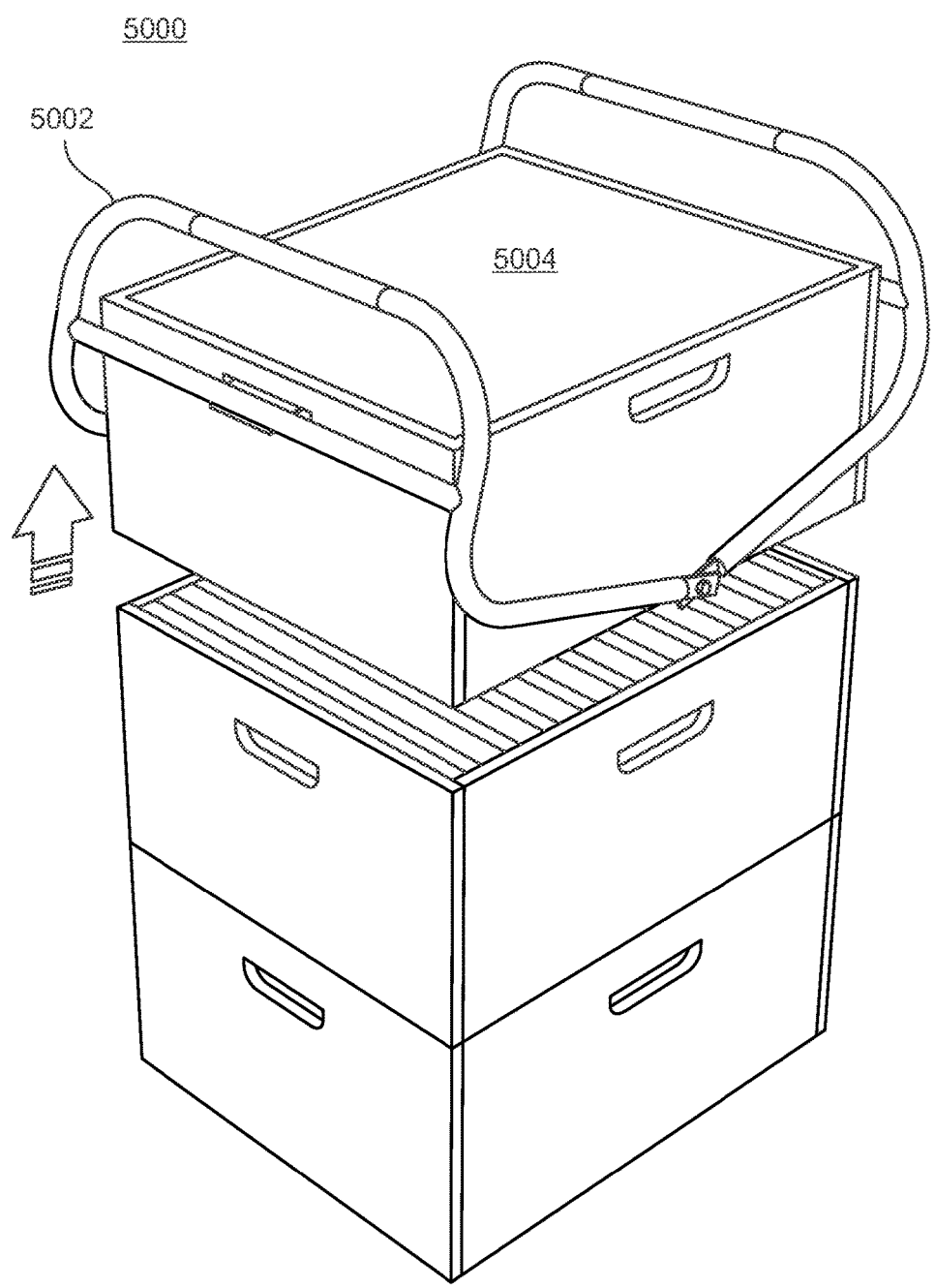
FIG. 5 is a perspective view of an exemplary embodiment of a system 5000.

FIG. 5 is a perspective view of an exemplary embodiment of a system 5000, which illustrates a lifting frame 5002 lifting a box 5004 (without illustration of a user holding lifting frame 5002—see, user 1006 of FIG. 1).

Figures 6, 7:
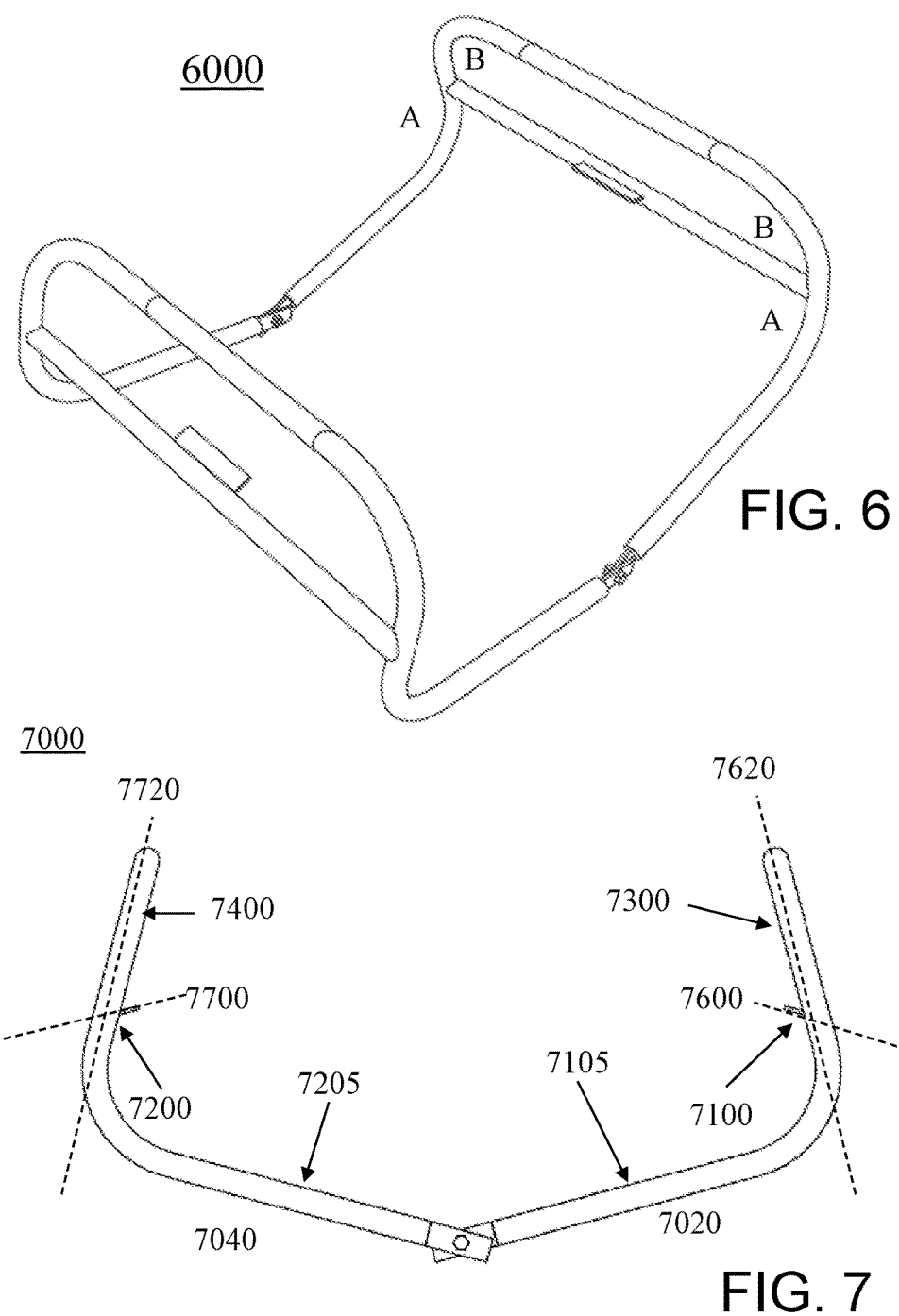
FIG. 6 is a perspective view of an exemplary embodiment of a system 6000.
FIG. 7 is a perspective view of an exemplary embodiment of a system 7000.

FIG. 6 is a perspective view of an exemplary embodiment of a system 6000, which illustrates first radius of curvature A and second radius of curvature B (discussed in more detail in the description of FIG. 2).

FIG. 7 is a perspective view of an exemplary embodiment of a system 7000 which illustrates:

a first bar 7020 comprising:
  a first substantially straight portion 7105;
  a second substantially straight portion 7300; and
  a first lifting flange 7100, longitudinal axis 7600 defined by first lifting flange 7100 intersecting longitudinal axis 7620 defined by second substantially straight portion 7300 at an angle of approximately sixty degrees;

a second bar 7040 comprising:
  a first substantially straight portion 7205;
  a second substantially straight portion 7400; and
  a second lifting flange 7200, longitudinal axis 7700 defined by second lifting flange 7200 intersecting longitudinal axis 7720 defined by second substantially straight portion 7400 at an angle of approximately sixty degrees.

Figure 8:
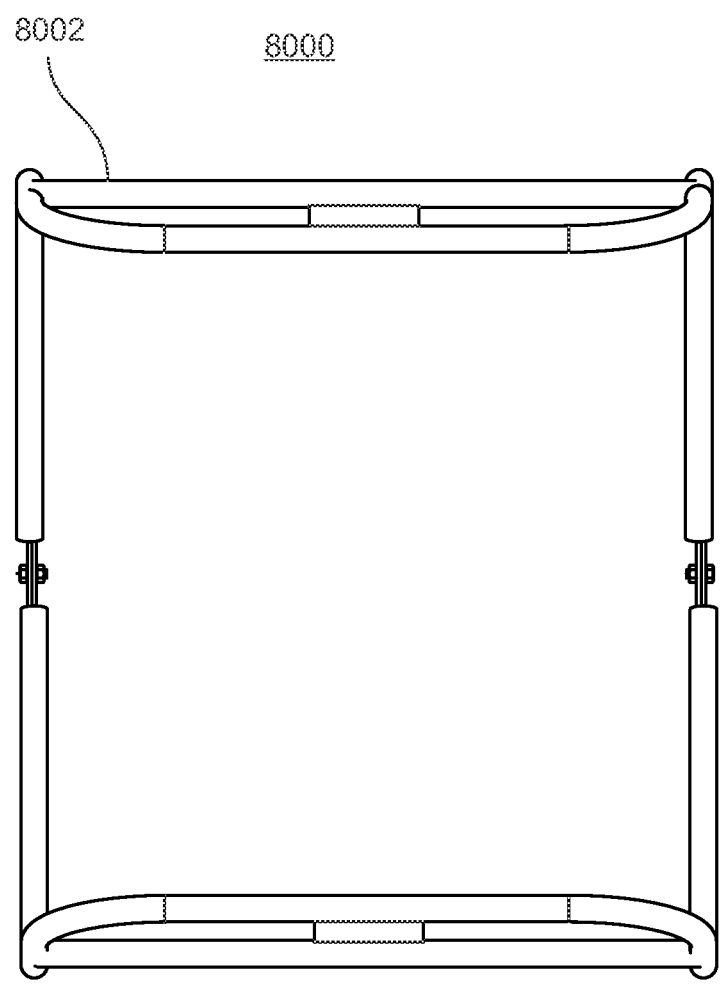
FIG. 8 is a perspective view of an exemplary embodiment of a system 8000.

FIG. 8 is a perspective view of an exemplary embodiment of a system 8000, which illustrates a view from above a lifting frame 8002.

Figure 9:
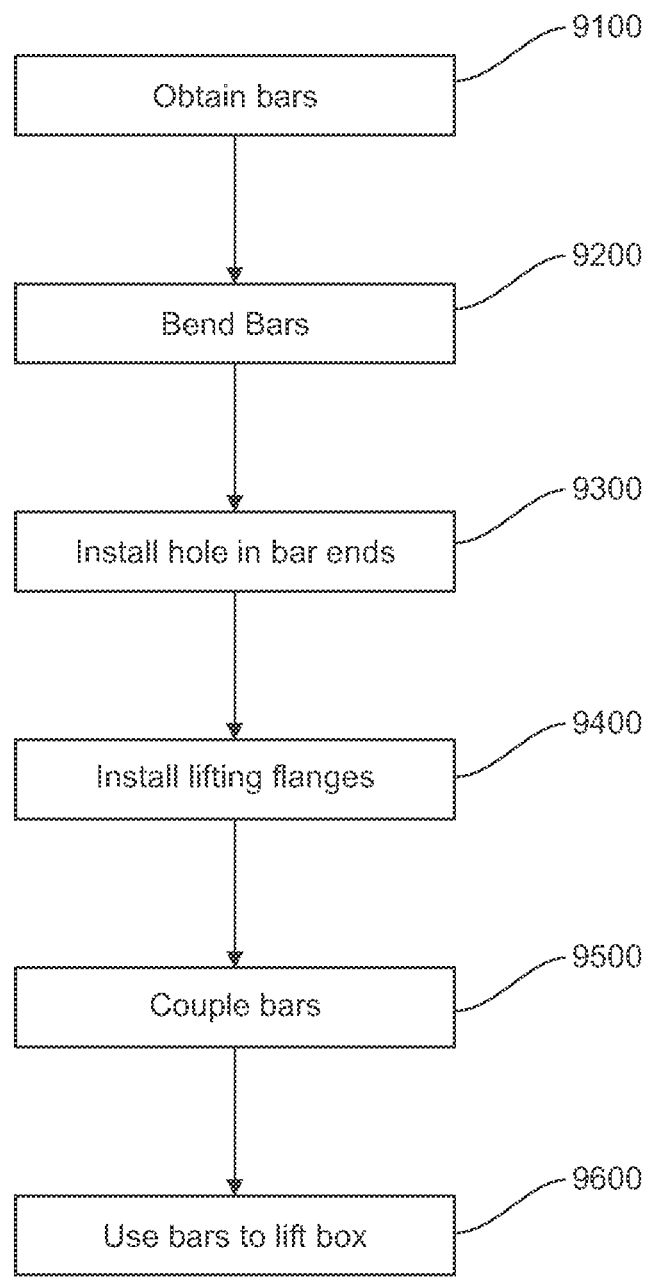
FIG. 9 is a flowchart of an exemplary embodiment of a method 9000.

FIG. 9 is a flowchart of an exemplary embodiment of a method 9000. At activity 9100, bars can be obtained. At activity 9200, bars can be bent for the use in a lifting frame. At activity 9300, a hole can be installed in ends of the bars. At activity 9400, a first lifting flange and a second lifting flange can be installed on each of a first bar and a second bar.

At activity 9500, the first bar and the second bar can be coupled together via pivotable pin to make a lifting frame system.

The system can comprise a first bar, the first bar can comprise:
- a first end;
- a second end;
- a first substantially straight portion, the first substantially straight portion comprising the first end;
- a second substantially straight portion, the second substantially straight portion coupled to the first substantially straight portion via a first curved portion defining a first radius of curvature, a longitudinal axis of the first substantially straight portion of the first bar intersecting with a longitudinal axis of the second substantially straight portion of the first bar at an angle of approximately ninety degrees;
- a third substantially straight portion, the third substantially straight portion coupled to the second substantially straight portion via a second curved portion defining a second radius of curvature, the longitudinal axis of the second substantially straight portion of the first bar intersecting with a longitudinal axis of the third substantially straight portion of the first bar at the angle of approximately ninety degrees;
- a fourth substantially straight portion, the fourth substantially straight portion coupled to the third substantially straight portion via a third curved portion defining the second radius of curvature, the longitudinal axis of the third substantially straight portion of the first bar intersecting with a longitudinal axis of the fourth substantially straight portion of the first bar at the angle of approximately ninety degrees;
- a fifth substantially straight portion, the fifth substantially straight portion coupled to the fourth substantially straight portion via a fourth curved portion defining the first radius of curvature, the longitudinal axis of the fourth substantially straight portion of the first bar intersecting with a longitudinal axis of the fifth substantially straight portion of the first bar at the angle of approximately ninety degrees, the fifth substantially straight portion comprising the second end;
- a first lifting flange, the first lifting flange coupled to the second substantially straight portion of the first bar, a longitudinal axis of the first lifting flange intersecting with the longitudinal axis of the second straight portion of the first bar at an angle of approximately sixty degrees; and/or
- a second lifting flange, the second lifting flange coupled to the fourth substantially straight portion of the first bar, a longitudinal axis of the second lifting flange intersecting with the longitudinal axis of the fourth straight portion of the first bar at the angle of approximately sixty degrees;

a second bar, the second bar can comprise:
- a first end;
- a second end;
- a first substantially straight portion, the first substantially straight portion comprising the first end;
- a second substantially straight portion, the second substantially straight portion coupled to the first substantially straight portion via a first curved portion defining the first radius of curvature, a longitudinal axis of the first substantially straight portion of the second bar intersecting with a longitudinal axis of the second substantially straight portion of the second bar at the angle of approximately ninety degrees;
- a third substantially straight portion, the third substantially straight portion coupled to the second substantially straight portion via a second curved portion defining the second radius of curvature, the longitudinal axis of the second substantially straight portion of the second bar intersecting with a longitudinal axis of the third substantially straight portion of the second bar at the angle of approximately ninety degrees;
- a fourth substantially straight portion, the fourth substantially straight portion coupled to the third substantially straight portion via a third curved portion defining the second radius of curvature, the longitudinal axis of the third substantially straight portion of the second bar intersecting with a longitudinal axis of the fourth substantially straight portion of the second bar at the angle of approximately ninety degrees;
- a fifth substantially straight portion, the fifth substantially straight portion coupled to the fourth substantially straight portion via a fourth curved portion defining the first radius of curvature, the longitudinal axis of the fourth substantially straight portion of the second bar intersecting with a longitudinal axis of the fifth substantially straight portion of the second bar at the angle of approximately ninety degrees, the fifth substantially straight portion comprising the second end;
- a first lifting flange, the first lifting flange coupled to the second substantially straight portion of the second bar, a longitudinal axis of the first lifting flange intersecting with the longitudinal axis of the second straight portion of the second bar at the angle of approximately sixty degrees; and/or
- a second lifting flange, the second lifting flange coupled to the fourth substantially straight portion of the second bar, a longitudinal axis of the second lifting flange intersecting with the longitudinal axis of the fourth straight portion of the second bar at the angle of approximately sixty degrees.

Wherein the first bar can be coupled to the second bar via:
- a first pivotable pin between the first end of the first bar and the first end of the second bar; and/or
- a second pivotable pin between the second end of the first bar and the second end of the second bar.

Wherein each of the first lifting flange and the second lifting flange of the first bar and the first lifting flange and the second lifting flange of the second bar can be adapted to grip a surface of a box when a user grips the third straight portion of the first bar and the third straight portion of the second bar and applies a force directed toward a center of the box, the system to constructed to allow the user to lift the box alone.

At activity 9600, the bars forming the lifting frame can be used to lift a box.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapter—a device used to effect operative compatibility between different parts of one or more pieces of an apparatus or system.

and/or—either in conjunction with or in alternative to.

alone—without the assistance of anyone else.

angle—an amount of rotation needed to bring one line or plane into coincidence with another, generally measured in radians or in degrees.

apparatus—an appliance or device for a particular purpose.

apply—to cause to come into contact with.

associate—to join, connect together, and/or relate.

bar—a rigid length of a solid substance that is longer than it is wide or thick.

box—a container, case, or receptacle, usually having a rectangular cross-section.

can—is capable of, in at least some embodiments.

cause—to produce an effect.

center—a part that is approximately in the middle of an object.

comprising—including but not limited to.

configure—to make suitable or fit for a specific use or situation.

connect—to join or fasten together.

constructed to—made suitable or fit for a specific use or situation.

coupleable—capable of being joined, connected, and/or linked together.

couple—to link or join in some fashion.

create—to bring into being.

cross member—a structural piece that adds support to a system.

curved—having a centerline that is a substantially continuous bending line, substantially without angles.

define—to establish the outline, form, or structure of.

device—a machine, manufacture, and/or collection thereof.

directed—aimed at.

enable—to make possible.

end—the last part or extremity, lengthwise, of anything that is longer than it is wide or broad flange—a weldable steel plate that is constructed to engage with a box such that the box can be lifted via a lifting frame coupled to the weldable steel plate.

force—a static influence that produces an elastic strain in a body or system or bears weight.

grip—to grasp or hold.

install—to connect or set in position and prepare for use.

intersect—to have one or more points in common.

lift—to move upward relative to the surface of the earth.

lifting flange—a portion of a device adapted to directly engage with and grip a lifted object.

longitudinal axis—a line along the lengthwise direction of the figure or body about which a three-dimensional body or figure is substantially symmetrical.

maintain—to preserve in a current condition.

make—to bring into existence by shaping, changing material, and/or combining parts, etc.

may—is allowed and/or permitted to, in at least some embodiments.

method—a process, procedure, and/or collection of related activities for accomplishing something.

plurality—the state of being plural and/or more than one.

portion—a part of an object.

predetermined—established in advance.

provide—to furnish, supply, give, and/or make available.

radius of curvature—the radius of a circle, the curvature of which is equal to that of a given curve at that point.

receive—to get as a signal, take, acquire, and/or obtain.

repeatedly—again and again; repetitively.

set—a related plurality.

spacing—a distance between components.

straight—substantially without a bend, angle, or curve.

substantially—to a great extent or degree.

support—to bear the weight of, especially from below.

surface—an outer portion of an object.

system—a collection of mechanisms, devices, machines, articles of manufacture, processes, data, and/or instructions, the collection designed to perform one or more specific functions.

tubular—having a cylindrical cross section that is hollow.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system, comprising:
   a first bar, said first bar comprising:
     a first end;
     a second end;
     a first substantially straight portion, said first substantially straight portion comprising said first end;
     a second substantially straight portion, said second substantially straight portion coupled to said first substantially straight portion via a first curved portion defining a radius of curvature value, a longitudinal axis of said first substantially straight portion of said first bar intersecting with a longitudinal axis of said second substantially straight portion of said first bar at an angle of approximately ninety degrees;
     a third substantially straight portion, said third substantially straight portion coupled to said second substantially straight portion via a second curved portion defining a radius of curvature value, said longitudinal axis of said second substantially straight portion of said first bar intersecting with a longitudinal axis of said third substantially straight portion of said first bar at an angle of approximately ninety degrees;
     a fourth substantially straight portion, said fourth substantially straight portion coupled to said third substantially straight portion via a third curved portion defining a radius of curvature value, said longitudinal axis of said third substantially straight portion of said first bar intersecting with a longitudinal axis of said fourth substantially straight portion of said first bar at an angle of approximately ninety degrees;
     a fifth substantially straight portion, said fifth substantially straight portion coupled to said fourth substantially straight portion via a fourth curved portion defining a radius of curvature value, said longitudinal axis of said fourth substantially straight portion of said first bar intersecting with a longitudinal axis of said fifth substantially straight portion of said first bar at an angle of approximately ninety degrees, said fifth substantially straight portion comprising said second end;
     a first cross member, said first cross member coupled to said second substantially straight portion of said first bar and said fourth substantially straight portion of said first bar, said first cross member constructed to maintain a spacing between said second substantially straight portion of said first bar and said fourth substantially straight portion of said first bar;
     a first lifting flange, said first lifting flange coupled to said first cross member;
   a second bar, said second bar comprising:
     a first end;
     a second end;
     a first substantially straight portion, said first substantially straight portion comprising said first end;
     a second substantially straight portion, said second substantially straight portion coupled to said first substantially straight portion via a first curved portion defining a radius of curvature value, a longitudinal axis of said first substantially straight portion of said second bar intersecting with a longitudinal axis of said second substantially straight portion of said second bar at an angle of approximately ninety degrees;
     a third substantially straight portion, said third substantially straight portion coupled to said second substantially straight portion via a second curved portion defining a radius of curvature value, said longitudinal axis of said second substantially straight portion of said second bar intersecting with a longitudinal axis of said third substantially straight portion of said second bar at an angle of approximately ninety degrees;
     a fourth substantially straight portion, said fourth substantially straight portion coupled to said third substantially straight portion via a third curved portion defining a value, said longitudinal axis of said third substantially straight portion of said second bar intersecting with a longitudinal axis of said fourth substantially straight portion of said second bar at an angle of approximately ninety degrees;
     a fifth substantially straight portion, said fifth substantially straight portion coupled to said fourth substantially straight portion via a fourth curved portion defining a radius of curvature value, said longitudinal axis of said fourth substantially straight portion of said second bar intersecting with a longitudinal axis of said fifth substantially straight portion of said second bar at an angle of approximately ninety degrees, said fifth substantially straight portion comprising said second end;
     a second cross member, said second cross member coupled to said second substantially straight portion of said second bar and said fourth substantially straight portion of said second bar, said second cross member constructed to maintain a spacing between said second substantially straight portion of said second bar and said fourth substantially straight portion of said second bar;
     a second lifting flange, said second lifting flange coupled to said second cross member;
   wherein said first bar is coupled to said second bar via:
     a first pivotable pin coupling said first end of said first bar and said first end of said second bar; and
     a second pivotable pin coupling said second end of said first bar and said second end of said second bar
   wherein each of said first lifting flange and said second lifting flange are adapted to grip a surface of a box when a user grips said third straight portion of said first bar and said third straight portion of said second bar and applies a force directed toward a center of said box, said system constructed to enable said user alone to lift said box.

2. The system of claim 1, wherein:
said first bar is tubular.

3. The system of claim 1, wherein:
said first bar and said second bar comprise metal tubing.

4. A method comprising:
making a system, said system comprising:
- a first bar, said first bar comprising:
  - a first end;
  - a second end;
  - a first substantially straight portion, said first substantially straight portion comprising said first end;
  - a second substantially straight portion, said second substantially straight portion coupled to said first substantially straight portion via a first curved portion defining a radius of curvature value, a longitudinal axis of said first substantially straight portion of said first bar intersecting with a longitudinal axis of said second substantially straight portion of said first bar at an angle of approximately ninety degrees;
  - a third substantially straight portion, said third substantially straight portion coupled to said second substantially straight portion via a second curved portion defining a radius of curvature value, said longitudinal axis of said second substantially straight portion of said first bar intersecting with a longitudinal axis of said third substantially straight portion of said first bar at an angle of approximately ninety degrees;
  - a fourth substantially straight portion, said fourth substantially straight portion coupled to said third substantially straight portion via a third curved portion defining a radius of curvature value, said longitudinal axis of said third substantially straight portion of said first bar intersecting with a longitudinal axis of said fourth substantially straight portion of said first bar at an angle of approximately ninety degrees;
  - a fifth substantially straight portion, said fifth substantially straight portion coupled to said fourth substantially straight portion via a fourth curved portion defining a radius of curvature value, said longitudinal axis of said fourth substantially straight portion of said first bar intersecting with a longitudinal axis of said fifth substantially straight portion of said first bar at an angle of approximately ninety degrees, said fifth substantially straight portion comprising said second end;
  - a first cross member, said first cross member coupled to said second substantially straight portion of said first bar and said fourth substantially straight portion of said first bar, said first cross member constructed to maintain a spacing between said second substantially straight portion of said first bar and said fourth substantially straight portion of said first bar;
  - a first lifting flange, said first lifting flange coupled to said first cross member, a longitudinal axis of said first lifting flange intersecting with said longitudinal axis of said second straight portion of said first bar at an angle of approximately sixty degrees;
- a second bar, said second bar comprising:
  - a first end;
  - a second end;
  - a first substantially straight portion, said first substantially straight portion comprising said first end;
  - a second substantially straight portion, said second substantially straight portion coupled to said first substantially straight portion via a first curved portion defining a radius of curvature value, a longitudinal axis of said first substantially straight portion of said second bar intersecting with a longitudinal axis of said second substantially straight portion of said second bar at an angle of approximately ninety degrees;
  - a third substantially straight portion, said third substantially straight portion coupled to said second substantially straight portion via a second curved portion defining a radius of curvature value, said longitudinal axis of said second substantially straight portion of said second bar intersecting with a longitudinal axis of said third substantially straight portion of said second bar at an angle of approximately ninety degrees;
  - a fourth substantially straight portion, said fourth substantially straight portion coupled to said third substantially straight portion via a third curved portion defining a radius of curvature value, said longitudinal axis of said third substantially straight portion of said second bar intersecting with a longitudinal axis of said fourth substantially straight portion of said second bar at an angle of approximately ninety degrees;
  - a fifth substantially straight portion, said fifth substantially straight portion coupled to said fourth substantially straight portion via a fourth curved portion defining a radius of curvature value, said longitudinal axis of said fourth substantially straight portion of said second bar intersecting with a longitudinal axis of said fifth substantially straight portion of said second bar at an angle of approximately ninety degrees, said fifth substantially straight portion comprising said second end;
  - a second cross member, said second cross member coupled to said second substantially straight portion of said second bar and said fourth substantially straight portion of said second bar, said second cross member constructed to maintain a spacing between said second substantially straight portion of said second bar and said fourth substantially straight portion of said second bar;
  - a second lifting flange, said second lifting flange coupled to said second cross member, a longitudinal axis of said second lifting flange intersecting with said longitudinal axis of said second straight portion of said second bar at an angle of approximately sixty degrees;
wherein said first bar is coupled to said second bar via:
a first pivotable pin coupling said first end of said first bar and said first end of said second bar; and
a second pivotable pin coupling said second end of said first bar and said second end of said second bar
wherein each of said first lifting flange and said second lifting flange are adapted to grip a surface of a box when a user grips said third straight portion of said first bar and said third straight portion of said second bar and applies a force directed toward a center of said box, said system to constructed to enable said user to lift said box alone.

* * * * *